United States Patent [19]

Mojonnier

[11] Patent Number: 4,801,471

[45] Date of Patent: Jan. 31, 1989

[54] CLOSED CIRCUIT BEVERAGE PROCESSING WITH ACCUMULATOR

[75] Inventor: Harry G. Mojonnier, River Forest, Ill.

[73] Assignee: Robert C. Stewart, LaGrange, Ill.

[21] Appl. No.: 898,954

[22] Filed: Aug. 21, 1986

[51] Int. Cl.[4] .............................................. A23L 2/00
[52] U.S. Cl. ..................................... 426/590; 426/487; 99/275
[58] Field of Search ............... 426/329, 486, 487, 488, 426/590, 386, 387, 388, 431, 492, 599; 99/275

[56] References Cited

U.S. PATENT DOCUMENTS

| | | | |
|---|---|---|---|
| 1,989,399 | 1/1935 | Browne | 426/486 |
| 2,299,553 | 10/1942 | McKinnis | 426/487 |
| 2,428,044 | 9/1947 | Sharp et al. | 426/487 |
| 2,433,071 | 12/1947 | Stevenson | 426/590 |
| 2,631,103 | 3/1953 | Kermer | 426/487 |
| 2,701,771 | 6/1949 | Johnson et al. | 426/599 |
| 3,044,887 | 7/1962 | Smith | 426/387 |
| 3,113,871 | 12/1963 | Webster | 426/388 |
| 3,272,020 | 9/1966 | Witt et al. | 74/18.1 |
| 3,286,764 | 11/1966 | Mojonnier et al. | 159/44 |
| 3,391,009 | 7/1968 | Fehlberg et al. | 426/431 |
| 3,446,241 | 5/1969 | Skoli | 137/553 |
| 3,574,987 | 4/1971 | Skoli et al. | 55/193 |
| 3,584,438 | 6/1971 | Skoli et al. | 55/193 |
| 3,741,552 | 6/1973 | Skoli et al. | 261/140 |
| 3,945,411 | 3/1976 | Skoli et al. | 141/91 |
| 4,112,828 | 9/1978 | Mojonnier et al. | 99/275 |
| 4,191,784 | 3/1980 | Mojonnier et al. | 426/475 |
| 4,216,711 | 8/1980 | Skoli et al. | 99/277.2 |
| 4,265,167 | 5/1981 | Mojonnier et al. | 99/323.2 |
| 4,350,503 | 9/1982 | Skoli et al. | 55/165 |
| 4,352,679 | 10/1982 | Notardonato et al. | 55/38 |
| 4,352,682 | 10/1982 | Kemp et al. | 55/165 |
| 4,358,296 | 11/1982 | Notardonato et al. | 55/38 |
| 4,599,239 | 7/1986 | Wieland et al. | 426/487 |

FOREIGN PATENT DOCUMENTS

| | | |
|---|---|---|
| 0098389 | 1/1984 | European Pat. Off. . |
| 2164582 | 3/1986 | United Kingdom . |

*Primary Examiner*—Donald E. Czaja
*Assistant Examiner*—Carolyn Paden
*Attorney, Agent, or Firm*—Trexler, Bushnell and Wolters, Ltd.

[57] ABSTRACT

A method of beverage processing is disclosed wherein unwanted gases are stripped from ingredient water to form treated ingredient water. Formulating syrup to be utilized in mixing a beverage product is combined with the treated ingredient water as a water portion of the syrup, and the formulated syrup is mixed with one or more other constituents of the beverage product including water, using only the treated ingredient water.

3 Claims, 1 Drawing Sheet

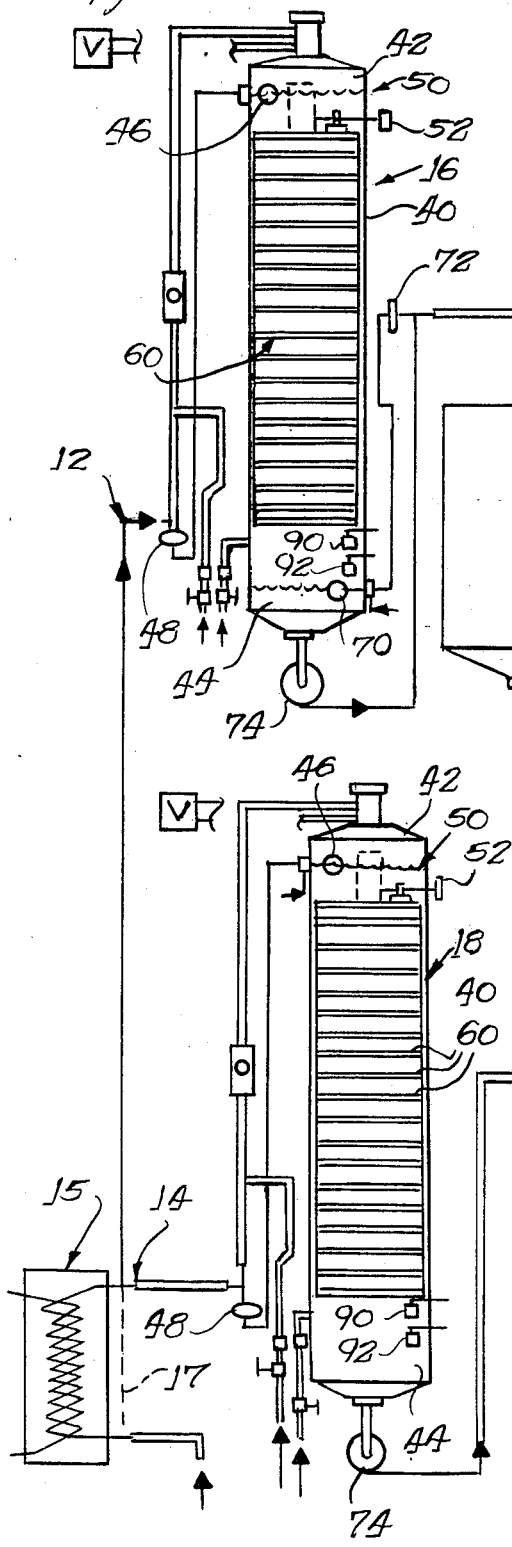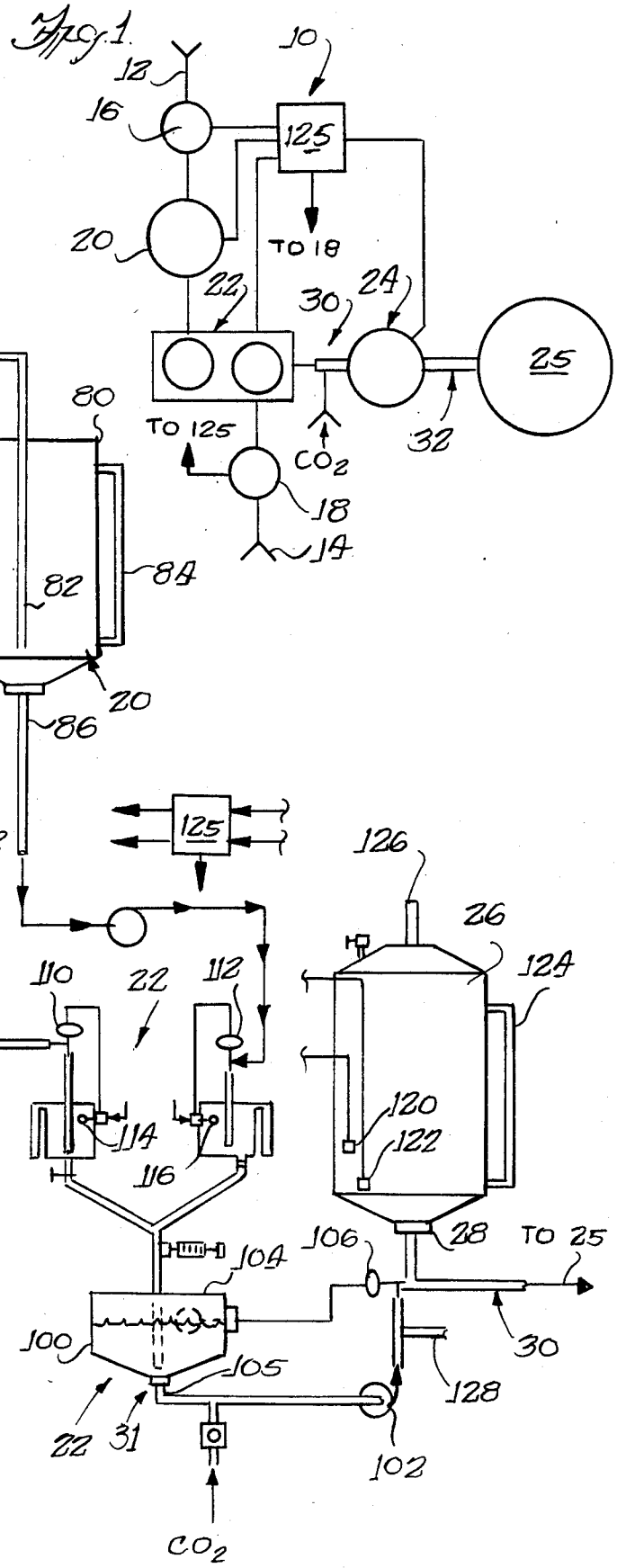

CLOSED CIRCUIT BEVERAGE PROCESSING WITH ACCUMULATOR

BACKGROUND OF THE INVENTION

This invention is directed to the beverage processing arts, and more particularly to a novel and improved method of beverage processing in a controlled, closed circuit manner utilizing an accumulator, and advantageously substantially eliminating unwanted air from ingredient water.

In the beverage industry, it has been found in some instances desirable to remove extraneous gaseous matter (e.g. air and oxygen) from ingredient water used in the process. This is done to achieve improved stability of the beverage during preparation and especially during the filling process, as well as during storage prior to consumption. More particularly, during the filling process, extraneous gaseous matter and particularly air, has been found to cause excessive "foaming" of some beverage products, making accurate filling of individual containers difficult or impossible. Following the filling process, extraneous gaseous matter, particularly air and oxygen, can promote premature deterioration of the beverage within the container or package. Accordingly, scrubbing of the water utilized in beverage preparation and processing can beneficially address both of these problems.

Generally speaking, beverage processing or the preparation of beverage products involves at least two steps. Initially, a "syrup" or concentrate is formulated from selected constituents or ingredients and water. Thereafter, this beverage syrup or concentrate is mixed with additional water to form the finished beverage product of the desired concentration. During this latter mixing process, additional ingredients may be added if desired to formulate the finished beverage product. However, heretofore it has been the practice to employ scrubbing only of the water used during the latter, mixing portion of the beverage preparation process. In this regard, it has heretofore been considered ufficient to remove extraneous gas or air from only the ingredient water used during the mixing portion of the process.

We have found that increased advantages can be obtained, however, by similarly treating or scrubbing the ingredient water utilized in syrup formulation. Moreover, we have found that further improvement can be realized by scrubbing or stripping unwanted air from ingredient water to a substantially lower level than heretofore obtained.

Additionally, the prior art methods and systems have heretofore utilized a relatively large, finished product tank or reservoir for receiving the finished, mixed beverage product from the processing or mixing system and forming a supply of finished beverage product for use by the downstream filling equipment in filling individual containers. In this regard, finished product has generally been delivered to an enlarged tank from a top or uppermost inlet portion thereof and delivered from this tank or reservoir to the downstream filling equipment through a separate, bottom or lower outlet portion thereof. Accordingly, a relatively large amount of finished product may be in the finished product reservoir or in circuit through the processing system at any given time.

However, it is relatively difficult to stop or shut down such a system when necessary, when such a large amount of product is in process at any given time. Such shutdown may be necessitated by malfunction of downstream filling equipment, by changeover to filling of a different beverage or to filling of different containers, or by periodic maintenance and/or cleaning procedures.

A related problem is that of obtaining adequate control of the beverage ingredients throughout the processing system to generally match the demand for ingredients at various points within the system itself, as well as to match the downstream demand for finished product. It is also desirable in connection with achieving such control to substantially minimize the amount of ingredients and finished product in transit throughout the system at any given time, to further facilitate relatively rapid shutdown of the system when desired. Moreover, such improved control of product flow and quantity throughout the system also greatly facilitates rapid response of the system to changes in the demand for ingredients both within the components of the system and by the downstream filling equipment.

OBJECTS OF THE INVENTION

Accordingly, it is a general object of the invention to provide a novel and improved beverage processing method, and a related beverage processing system.

A more specific object is to provide a beverage processing method and system which is capable of surprisingly accurate control of the flow of ingredients therethrough so as to coordinate the production of finished beverage product with downstream demand.

A related object is to provide a beverage processing method and related system which advantageously eliminates extraneous gaseous components, and particularly air, in all ingredient water utilized in the method and/or system to a substantially lower level than heretofore obtained.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

FIG. 1 is a top plan view, somewhat diagrammatic in form, of a method and system in accordance with the present invention; and FIG. 2 is an enlarged elevational view, also somewhat diagrammatic in form, illustrating further details of the method and system of FIG. 1.

DETAILED DESCRIPTION OF THE ILLUSTRATED EMBODIMENT

Referring initially to FIG. 1, a somewhat diagrammatic representation of a beverage processing system in accordance with the invention, in connection with which the method of the invention will also be described, is designated generally by reference numeral 10.

In accordance with the method of the invention, unwanted gases, and particularly dissolved air and oxygen, are stripped from ingredient water to form treated, substantially air-free ingredient water therefrom. In the beverage processing operation, ingredient water enters or is utilized at generally two places in the process, here designated at reference numerals 12 and 14. Accordingly, the system of the invention utilizes first and second substantially similar scrubbing means or apparatus 16, 18 for stripping the unwanted gases from the ingredient water at both inlets 12 and 14.

Advantageously, this therefore strips excess or unwanted gases from all of the ingredient water used in the beverage processing method and system of the invention. Optionally, the water entering at inlets 12, 14 may first be passed through a refrigeration or cooling unit 15, if desired. Some beverage processing requires such cooling. However, the cooling unit 15 forms no part of the invention. This cooling unit may be provided in the form of a counterflow-type heat exchange device or apparatus 15 which may be interposed to chill or cool the incoming water, immediately ahead of respective inlets 12 and 14. Alternatively, incoming water may be fed directly to these inlets 15 without cooling as indicated by bypass line 17, shown in phantom line.

The first scrubbing apparatus or means 16 is operatively coupled for delivering the treated ingredient water therefrom to a formulating means or apparatus 20 for formulating the syrup or concentrate portion of the beverage product to be utilized later in mixing the final beverage product. This formulating means or apparatus then delivers the formulated syrup or concentrate to a proportioner means or apparatus 22 which mixes the formulated syrup in the desired concentration with one or more other beverage constituents including further ingredient water. In accordance with the invention, the proportioner means or apparatus 22 is operatively coupled to receive treated water from the second scrubbing means or apparatus 18 for use as ingredient water in the mixing of the beverage carried out thereby.

In accordance with a preferred form of the invention, a finished product accumulator means or apparatus 24 is operatively coupled to receive the mixed beverage from the proportioner means or apparatus 22. Referring also briefly to FIG. 2, this product accumulator preferably comprises a container member or means 26 which has a combined inlet/outlet means or opening located at a bottommost or lowermost portion thereof, as indicated at reference numeral 28. Cooperatively, a conduit or conduit means 30 joins an outlet 31 of the proportioner to both the accumulator inlet/outlet 28 as well as to further downstream processing equipment, such as container filling equipment, as indicated generally at reference numeral 25 in FIG. 1. Accordingly, this accumulator 24 advantageously facilitates the matching of the flow of its finished product through the conduit 30 to the demand for product by the downstream filling or other equipment.

That is, the container 26 may provide a volume for storing some excess flow of product from the proportioner 22 when the downstream demand is lower than this flow. On the other hand, the accumulation of some excess product or a "head" in the accumulator 26 can also serve to accommodate small fluctuations in the flow rates and corresponding downstream demand for product. Further details of this accumulator and its operation will be more fully discussed hereinbelow.

In accordance with another aspect of the invention, the first and second scrubbing means or apparatus 16 and 18 comprise scrubbing columns for stripping air from the ingredient water to a very low level, and preferably to a level of on the order of substantially 0.01 parts per million or less. Referring also to FIG. 2, the scrubbing columns 16, 18, which are somewhat diagrammatically illustrated therein, are preferably of the type illustrated and described in my co-pending application, Ser. No. 654,304 filed Sept. 24, 1984, now U.S. Pat. No. 4,732,582, and entitled Scrubbing Apparatus. Reference is invited to this co-pending application for preferred details of the scrubbing column, which will not be described in detail herein.

Suffice it to say that each of these scrubbing columns 16, 18 includes an elongate, generally tubular column or scrubbing portion 40, and respective upper and lower reservoir portions 42, 44 operatively coupled to respective upper and lower ends of tubular column 40. The upper reservoir 42 preferably defines a flow control apparatus including a float-type valve control member 46 which control the operation of a controllable valve member 48 at the inlet 12 to the column, and more particularly at a top inlet of the reservoir 42. Hence, the flow of water to reservoir 42 is controlled by valve 48 generally in accordance with the level of water contained therein as determined by the float control member 46.

Advantageously, and as more fully described in the above-referenced co-pending application, an adjustable orifice means designated generally by reference numeral 50 is provided for controlling, together with the head of water provided by float 46, the rate of flow of water from the reservoir 42 to the scrubbing column 40 therebelow. This adjustable orifice arrangement or means 50 is provided with an externally projecting, manually operable control knob or member 52, which may be utilized to manually adjust the effective size of an opening or orifice between reservoir 42 and column 40.

Preferably, the column 40 comprises a plurality of similar, generally parallel and vertically arrayed or stacked tray members 50, which are more fully described in the above-mentioned co-pending application. In operation, small foramines or perforations in each of the sheets 60 generally "drip" the water through the column 40 against a countercurrent of scrubbing gas such as carbon dioxide, nitrogen, steam or the like. This process essentially substitutes the scrubbing gas for the dissolved oxygen in the water to the desired level. The size and design, as well as the number of the foraminous sheets 60 utilized in the column 40 can be arranged to obtain the desired 0.01 parts per million or less level of concentration in the ingredient water.

As described in the above-mentioned co-pending application, this flow control arrangement in the upper reservoir 42 advantageously matches the flow of water through the scrubbing apparatus for treatment to the downstream demand flow water. With respect to the first scrubbing apparatus 16, a further similar float-controlled valve arrangement including a float member 70 and valve 72 are provided for controlling the flow from an outlet thereof to the formulating means or apparatus 20. Preferably, an additional pump 74 is provided at the outlet of lower reservoir 44 for the treated ingredient water to the formulating means or apparatus 20. In this latter regard, formulating means or apparatus 20 preferably comprises an enlarged, open-top tank or mixing container to which other ingredients of the syrup may be added and mixed to the desired consistency or concentration with the treated water. This treated ingredient water is preferably introduced into the tank or container 80 at a lower portion by an elongate delivery tube or conduit 82. The tank may also be conveniently provided with an externally observable level indicator or gauge 84.

As more fully described in the above-referenced co-pending application, additional respective level sensors or probes 90, 92 are also provided in both lower reservoirs 44 for respectively energizing and de-energizing an electrical control system 125 for operating the valves 48. Preferably in this regard, each valve 48 assumes a closed state upon de-energization of the electrical control system therefor for cutting off the flow of water to the top of the associated column, when the level of treated water in reservoir 44 actuates level sensor 90. Conversely, when the level of water decreases sufficiently to actuate sensor 92, the electrical power or control for valve 48 is reestablished or re-energized, to permit operation of valve 48 under control of float 46 as previously described.

The formulated syrup from an outlet 86 of formulating means or tank 80 is fed to the proportioner means or apparatus 22 to be mixed with additional ingredients including at least some additional ingredient water from the second scrubbing means or column 18. In this regard, column 18, by way of its lower reservoir 44 also feeds an inlet of the proportioner 22. This proportioner 22 is also preferably of the general form illustrated and discussed in the above-referenced co-pending application. However, in the present embodiment a proportioner unit for mixing only two ingredients, namely, the formulated syrup and additional ingredient water, has been illustrated for purposes of description.

Accordingly, reference to the above-referenced co-pending application is invited for a more complete description of the operation of proportioner unit 22. Suffice it to say that the product is mixed in desired proportions and delivered to an outlet reservoir 100. This latter reservoir 100 is preferably provided with an outlet pump 102 and a float-control valve arrangement including float-control member 104 and a valve 106 for controlling the flow downstream of pump 102. This arrangement is similar to that described with respect to the outlet of scrubbing column 16 described above. The outlet 31 thus feeds the previously mentioned outlet line or conduit 30 which in turn delivers the mixed product both to the downstream equipment as indicated at 25 (FIG. 1) and to the combined inlet/outlet of the accumulator 24 as discussed hereinabove.

In accordance with a further preferred feature of the invention, a plurality of flow control valve members, including the previously described flow control valve members 48 at the inlets to the respective scrubbing columns 16 and 18 and the similar control valve 72 at the outlet of column 18 (or inlet of formulating apparatus 20) as well as valve 106 in the outlet conduit 30, are responsive to predetermined control signals for alternatively permitting or preventing fluid flow therethrough. These control valves further include a pair of additional, similar float-controlled valve members 110, 112, which include respective associated float-type control members 114 and 116. The valves 110, 112 are interposed in respective inlets to the proportioner apparatus 22. That is, valve 110 is interposed in the treated water inlet to the proportioner while valve 112 is interposed in the formulated syrup inlet thereof.

Cooperatively, level sensing means or sensor members 120 and 122 are provided in the accumulator container 26 for producing control signals in accordance with the level of the mixed product contained therein. These level sensors 120 and 122 operate in connection with the electrical control system diagrammatically indicated at reference numeral 125 for further controlling energization and de-energization of the controls for the respective valve members. That is, when the level of mixed product in tank or container 26 reaches the level of level sensor 120, all of the upstream valves will respond by assuming a closed state, to prevent the carrying out of further processing in the system. On the other hand, when the level of finished product reaches the lower level sensor 122, the system will be re-energized, permitting the respective valves to operate under the control of their associated float members as previously indicated.

The accumulator may also be provided with a level gauge 124 similar to the level gauge 84 associated with the mixing or formulating tank 80. Moreover, to facilitate periodic cleaning or rinsing of the equipment, additional, normally closed but selectively openable ports 126 and 128 may be provided at an upper or topmost portion of accumulator 24 and in the outlet conduit 30, respectively.

It will be appreciated from the foregoing that the flow of ingredients and of finished product through the illustrated system is relatively closely controlled in a closed circuit fashion by the described apparatus. More importantly, this flow is controlled so as to generally meet and match the downstream demand, for example by downstream filling equipment 25. This system also permits a relatively minimal amount of product and ingredients to be in process at any given time so as to enable relatively rapid response of the system to changes in demand, or a need to shut down for purposes of changing product, for accommodating filling apparatus malfunctions or for routine maintenance or cleaning of the equipment.

The foregoing arrangement also minimizes quantity of materials in process for reducing end-of-run losses. For sanitizing a system, the two orifices or ports 126 and 128 would be opened and a "jumper" conduit connected between. Thereupon the entire system could be flushed through with boiling water or other suitable rinsing fluid, with discharge thereof to the downstream equipment or filler through outlet port or line 30.

While particular embodiments of the invention have been shown and described in detail it will be obvious to those skilled in the art that changes and modifications of the present invention, in its various aspects, may be made without departing from the invention in its broader aspects, some of which changes and modifications being matters of routine engineering or design and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. A method of processing a beverage in a closed circuit comprising: stripping unwanted gases from ingredient water to form treated ingredient water; formulating syrup to be utilized in mixing a beverage product using only said treated ingredient water as a water portion of the syrup; mixing the formulated syrup with one or more other constituents of the beverage product including water to thereby form a finished product, using only said treated ingredient water for said mixing;

delivering said finished product to a supply line for downstream filling equipment; accumulating any excess of said finished product directly from the same said supply line and without interruption of the same, and making up any shortage of finished product from the excess previously accumulated, so as to substantially match the flow of finished product in the supply line to the demand therefor by downstream equipment.

2. A method according to claim 1 wherein the step of stripping comprises stripping dissolved air from ingredient water to a level of substantially on the order of 0.01 parts per million or less.

3. A method according to claim 1 wherein the step of accumulating further includes the step of sensing the level of accumulated product and controlling the flows of ingredient water and beverage constituents, as well as the flows of formulated syrup and mixed beverage product, at a plurality of predetermined locations in a beverage processing system configured for carrying out said method, to thereby substantially match the flow of water, constituents, formulated syrup and finished product through said system with the demand therefor both at other portions of said system and the demand for finished product by further downstream processing equipment, and for substantially minimizing the amount of fluid in process throughout said system so as to facilitate relatively rapid and complete shutdown thereof upon demand.

* * * * *